US011718218B2

United States Patent
Qiu et al.

(10) Patent No.: US 11,718,218 B2
(45) Date of Patent: *Aug. 8, 2023

(54) VEHICLE

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

This patent is subject to a terminal disclaimer.

(21) Appl. No.: 17/177,600

(22) Filed: Feb. 17, 2021

(65) Prior Publication Data

US 2021/0170935 A1 Jun. 10, 2021

Related U.S. Application Data

(63) Continuation of application No. 16/170,697, filed on Oct. 25, 2018, now Pat. No. 10,953,783.

(30) Foreign Application Priority Data

Oct. 30, 2017 (JP) .................. 2017-209355

(51) Int. Cl.
*B60P 3/20* (2006.01)
*B60R 25/20* (2013.01)
(Continued)

(52) U.S. Cl.
CPC .............. *B60P 3/20* (2013.01); *B60R 16/023* (2013.01); *B60R 25/20* (2013.01); *E05F 15/77* (2015.01); *E05Y 2900/546* (2013.01)

(58) Field of Classification Search
CPC .............. B60P 3/20; B60R 2011/0036; B60R 2011/0084; B60R 7/02; B60R 16/023; B60R 25/20; E05F 15/77; E05Y 2900/546
See application file for complete search history.

(56) References Cited

U.S. PATENT DOCUMENTS

| 3,858,405 A | 1/1975 | Manzke |
| 4,637,222 A | 1/1987 | Fujiwara et al. |
| (Continued) | | |

FOREIGN PATENT DOCUMENTS

| DE | 10027373 A1 | 12/2001 |
| DE | 102013226457 A1 | 6/2015 |
| (Continued) | | |

OTHER PUBLICATIONS

Teslarati, "Tesla Model S Front Truck (Frunk) Electric Cooler Review", (Jan. 31, 2014), Teslarati.com, 5 pages.

*Primary Examiner* — Gregory A Blankenship
(74) *Attorney, Agent, or Firm* — Hunton Andrews Kurth LLP

(57) ABSTRACT

A vehicle includes: a vehicle main body having a passenger compartment and a rear compartment located more rearward than the passenger compartment; a rear hatch provided on the vehicle main body and configured to open and close the rear compartment; a cooling box disposed in the rear compartment; a first communication device configured to communicate with an external server; a second communication device having a communication distance shorter than that of the first communication device; a locking device configured to lock the rear hatch; and a processor. The processor is configured to receive information about an opening signal from the server through the first communication device, and (Continued)

to open the rear hatch when the processor receives the opening signal through the second communication device.

1 Claim, 15 Drawing Sheets

(51) Int. Cl.
*B60R 16/023* (2006.01)
*E05F 15/77* (2015.01)

(56) References Cited

U.S. PATENT DOCUMENTS

| | | | |
|---|---|---|---|
| 4,765,151 A | 8/1988 | Bessey | |
| 4,779,923 A | 10/1988 | Lang et al. | |
| 4,878,706 A | 11/1989 | Novikov | |
| 6,973,799 B2 | 12/2005 | Kuehl et al. | |
| 7,393,037 B2 | 7/2008 | Hwang | |
| 7,513,007 B2 | 4/2009 | Chernoff | |
| 7,762,601 B2 | 7/2010 | Shea et al. | |
| 8,789,715 B2 | 7/2014 | Shea et al. | |
| 9,092,381 B2 | 7/2015 | Sasakura et al. | |
| 10,084,612 B2* | 9/2018 | Lai | G06F 3/015 |
| 10,087,672 B2* | 10/2018 | Kalhous | E05F 15/40 |
| 10,200,371 B2* | 2/2019 | Darnell | H04W 12/084 |
| 10,369,966 B1* | 8/2019 | Higgins | G07C 9/00571 |
| 10,573,110 B2* | 2/2020 | Tsujimura | G07F 17/13 |
| 10,717,412 B2* | 7/2020 | Abel Rayan | H04W 12/68 |
| 10,755,502 B2* | 8/2020 | Sakurada | B60R 25/241 |
| 10,769,929 B2* | 9/2020 | Qiu | B60P 3/20 |
| 10,810,814 B2* | 10/2020 | Sakurada | G07C 9/00896 |
| 10,891,811 B2* | 1/2021 | Nakajima | G06F 21/44 |
| 10,906,509 B1* | 2/2021 | Turk | G07C 5/0866 |
| 10,935,978 B2* | 3/2021 | Yalla | G06F 16/29 |
| 10,946,834 B2* | 3/2021 | Yanagida | G06Q 50/28 |
| 10,953,783 B2* | 3/2021 | Qiu | B60R 16/023 |
| 11,005,854 B2* | 5/2021 | Bigert | H04W 12/037 |
| 11,195,246 B2* | 12/2021 | Qiu | G07C 9/00571 |
| 11,222,493 B2* | 1/2022 | Kaneko | G06Q 10/0833 |
| 11,321,794 B2* | 5/2022 | Kobayashi | G06Q 50/28 |
| 11,397,908 B2* | 7/2022 | Endo | G05B 15/02 |
| 11,400,887 B2* | 8/2022 | Luchner | B60R 25/24 |
| 11,403,586 B2* | 8/2022 | Endo | G06Q 50/28 |
| 11,470,456 B2* | 10/2022 | Endo | H04W 12/04 |
| 2011/0121596 A1 | 5/2011 | Beyer | |
| 2013/0138714 A1* | 5/2013 | Ricci | G07C 5/08 709/201 |
| 2014/0142805 A1* | 5/2014 | Frye | B60W 40/09 701/36 |
| 2016/0099927 A1* | 4/2016 | Oz | G07C 5/0808 726/9 |
| 2016/0347279 A1 | 12/2016 | Groeneveld et al. | |
| 2017/0017920 A1* | 1/2017 | Stark | G06K 19/06037 |
| 2017/0147812 A1* | 5/2017 | Ujiie | H04L 12/28 |
| 2017/0204651 A1* | 7/2017 | Gussen | G07C 9/00174 |
| 2017/0241188 A1* | 8/2017 | Kalhous | B60J 5/10 |
| 2017/0291554 A1 | 10/2017 | Perez Astudillo et al. | |
| 2018/0266158 A1 | 9/2018 | Hellweg | |
| 2019/0118692 A1 | 4/2019 | Qiu et al. | |
| 2019/0122527 A1 | 4/2019 | Qiu et al. | |
| 2019/0012680 A1 | 5/2019 | Qiu et al. | |
| 2019/0126807 A1 | 5/2019 | Qiu et al. | |
| 2019/0145150 A1 | 5/2019 | Kidena et al. | |
| 2019/0276044 A1 | 9/2019 | Bae et al. | |
| 2019/0280893 A1 | 9/2019 | Ninagawa | |
| 2019/0329691 A1 | 10/2019 | Crawford et al. | |
| 2021/0099834 A1* | 4/2021 | Mountford | E05F 15/76 |
| 2021/0170935 A1* | 6/2021 | Qiu | B60R 25/20 |
| 2021/0293075 A1* | 9/2021 | Oesterling | G06Q 50/30 |
| 2021/0304127 A1* | 9/2021 | Yamamoto | B60R 11/00 |
| 2021/0370869 A1* | 12/2021 | Tazume | G06Q 10/0832 |
| 2022/0269268 A1* | 8/2022 | Lau | G05D 1/0268 |
| 2022/0410941 A1* | 12/2022 | Cha | E05F 15/77 |

FOREIGN PATENT DOCUMENTS

| | | |
|---|---|---|
| DE | 212014000095 U1 | 10/2015 |
| DE | 102016108470 A1 | 12/2016 |
| JP | S60166646 U | 11/1985 |
| JP | S61070142 U | 5/1986 |
| JP | S62162567 U | 10/1987 |
| JP | H10153369 A | 6/1998 |
| JP | 2002206838 A | 7/2002 |
| JP | 2003041825 A | 2/2003 |
| JP | 2004224148 A | 8/2004 |
| JP | 2006206225 A | 8/2006 |
| KR | 19980017291 U | 7/1998 |
| KR | 0132501 Y1 | 12/1998 |
| KR | 20060104299 A | 10/2006 |
| KR | 20140000050 A | 1/2014 |

* cited by examiner

VEHICLE

This is a continuation application of U.S. patent application Ser. No. 16/170,697, filed Oct. 25, 2018, which is based on Japanese Patent Application No. 2017-209355 filed on Oct. 30, 2017 with the Japan Patent Office, the entire contents of which are hereby incorporated by reference.

BACKGROUND

Field

The present disclosure relates to a vehicle.

Description of the Background Art

A van-type vehicle described in Japanese Patent Laying-Open No. 2002-206838 includes a driver's seat, a general baggage loading compartment, and a vehicle-mounted refrigerator. The general baggage loading compartment is disposed on the rear side of the driver's seat.

SUMMARY

The inventors of the present application have discussed a delivery system configured to deliver a delivery item to a cooling box mounted on a vehicle.

As for the vehicle used in the above-described delivery system, it is necessary to prevent another person from freely opening the cooling box and to allow a prescribed deliverer to open the cooling box. In this case, it is necessary to take into consideration the convenience when the deliverer puts the delivery item into the cooling box.

The present disclosure has been made in view of the above-described problem, and an object of the present disclosure is to provide a vehicle including a cooling box that can accommodate a delivery item, with improved convenience of a deliverer.

A vehicle according to the present disclosure includes: a vehicle main body having a passenger compartment and a rear compartment located more rearward than the passenger compartment; a rear hatch provided on the vehicle main body and configured to open and close the rear compartment; a cooling box disposed in the rear compartment; a first communication device configured to communicate with an external server; a second communication device having a communication distance shorter than that of the first communication device; a locking device configured to lock the rear hatch; and a processor. The processor is configured to receive information about an opening signal from the server through the first communication device, and to open the rear hatch when the processor receives the opening signal through the second communication device.

According to the above-described vehicle, a deliverer or the like can transmit the opening signal near the vehicle, thereby opening the rear hatch. When the vehicle is parked forward, the deliverer or the like can easily put a delivery item into the cooling box.

The cooling box is disposed closer to the rear hatch than the passenger compartment. According to the above-described vehicle, the deliverer, the user or the like can easily put the object into the cooling box.

The vehicle further includes a front-row seat and a rear-row seat disposed more rearward than the front-row seat. The front-row seat and the rear-row seat are disposed in the passenger compartment. The passenger compartment and the rear compartment are separated by the rear-row seat. By deforming at least a part of the rear-row seat, an object contained in the cooling box can be taken out from the passenger compartment.

According to the above-described vehicle, by deforming the rear-row seat, an object contained in the cooling box can be taken out from the passenger compartment.

The vehicle further includes: a first side surface and a second side surface arranged in a width direction; a first rear wheel disposed more rearward than a center in a front-back direction of the vehicle main body and on the first side surface side; and a second rear wheel disposed more rearward than the center and on the second side surface side. The cooling box is disposed between the first rear wheel and the second rear wheel. According to the above-described vehicle, even when the vehicle receives side collision, the cooling box can be protected.

The cooling box is disposed at a center in the width direction of the vehicle main body. According to the above-described vehicle, even when an object to be contained is put into the cooling box, disturbance of the balance of the vehicle in the right and left direction can be suppressed.

The cooling box is provided so as to be movable in the front-back direction of the vehicle main body within the rear compartment. According to the above-described vehicle, when an object to be contained is put into the cooling box, the cooling box is moved to the vehicle rear side, and thus, the object to be contained can be easily put into the cooling box. Furthermore, the cooling box is moved frontward, and thus, an object contained in the cooling box can be taken out from the passenger compartment.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11 is a plan view showing a cooling circuit 55 and the like.

DESCRIPTION OF THE PREFERRED EMBODIMENTS

First Embodiment

Figure 1:
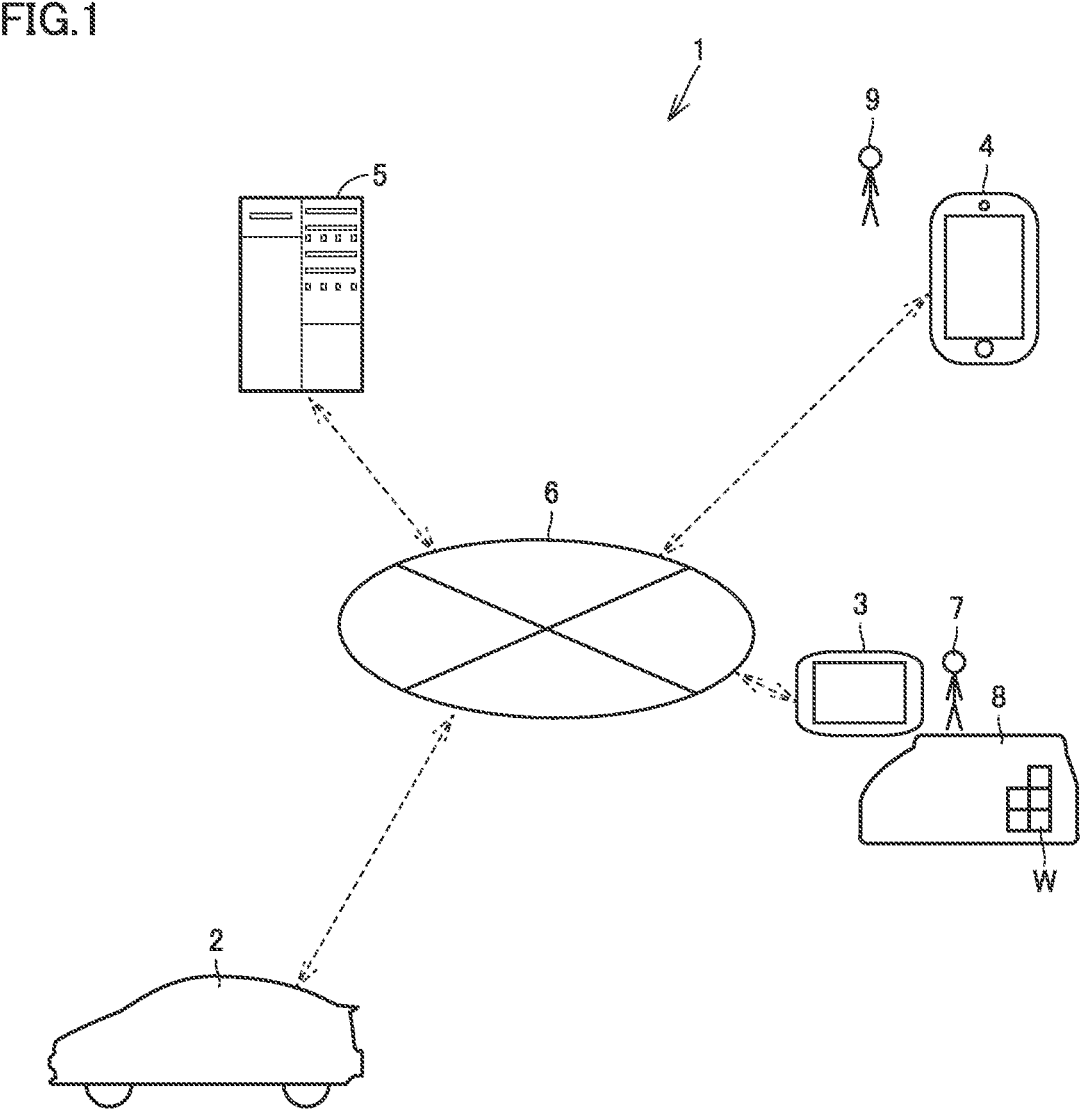
FIG. 1 is a schematic diagram schematically showing a delivery system 1.

A delivery system and a vehicle according to the present embodiment will be described with reference to FIGS. 1 to 24. The same or substantially the same components, of the components shown in FIGS. 1 to 24, are denoted by the same reference characters, and redundant description will not be repeated.

FIG. 1 is a schematic diagram schematically showing a delivery system 1. Delivery system 1 includes a vehicle 2, a deliverer terminal 3, a user terminal 4, a server 5, and the Internet (registered trademark) 6.

Vehicle 2, deliverer terminal 3, user terminal 4, and server 5 are configured to communicate with one another through the Internet 6.

Vehicle 2 is, for example, a vehicle owned by a user 9. Vehicle 2 is, for example, configured to transmit position information of vehicle 2 to server 5 through the Internet 6.

Deliverer terminal 3 is carried by a deliverer 7. Deliverer terminal 3 obtains various types of information from server 5 through the Internet 6. Deliverer 7 uses a delivery vehicle 8 to deliver a delivery item W to a prescribed delivery destination.

User terminal 4 is used by user 9. Examples of user terminal 4 include a smartphone, a mobile phone, a personal computer and the like.

By operating user terminal 4, user 9 can purchase a commodity and perform a delivery procedure.

Figure 2:
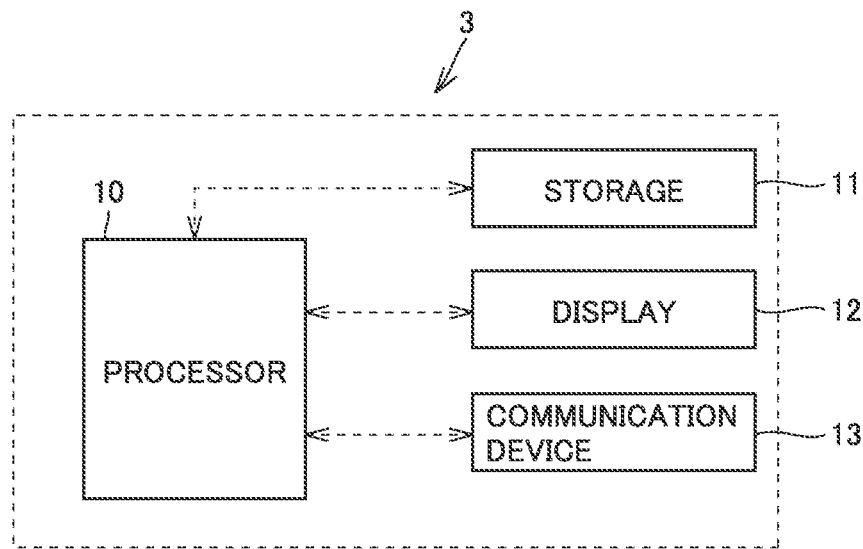
FIG. 2 is a block diagram schematically showing a configuration of a deliverer terminal 3.

FIG. 2 is a block diagram schematically showing a configuration of deliverer terminal 3. Deliverer terminal 3 includes a processor 10, a storage 11, a display 12, and a communication device 13.

Processor 10 executes processing operation using information stored in storage 11, information obtained from communication device 13, and the like. The processing operation in processor 10 is executed by software, hardware such as an electric circuit, or the like.

Prestored information, information obtained through communication device 13, and the like are stored in storage 11. Display 12 is a touch panel-type screen on which various types of information are displayed. Therefore, by operating display 12, deliverer 7 can input various types of information. Communication device 13 obtains various types of information from server 5 and the like through the Internet 6.

For example, communication device 13 obtains information such as a delivery destination of delivery item W from server 5 through the Internet 6.

Figure 3:
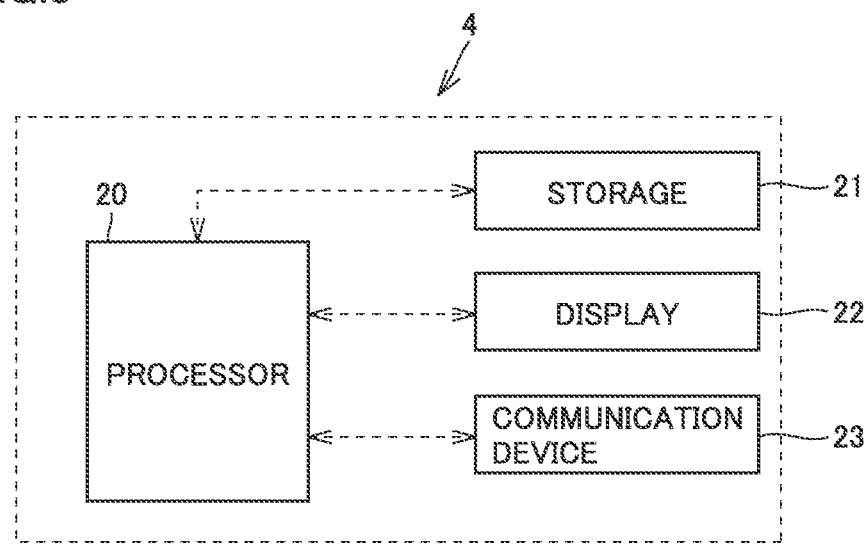
FIG. 3 is a block diagram schematically showing a configuration of a user terminal 4.

FIG. 3 is a block diagram schematically showing a configuration of user terminal 4. User terminal 4 includes a processor 20, a storage 21, a display 22, and a communication device 23. Processor 20 is configured to execute processing operation using information stored in storage 21 and information obtained through communication device 23. Prestored information and information obtained through communication device 23 are stored in storage 21.

Display 22 is configured to display various types of information. Display 22 is, for example, a touch panel-type liquid crystal display. Communication device 23 is configured to receive and transmit information to and from server 5 and the like through the Internet 6 and the like.

By operating display 22, user 9 can, for example, purchase a commodity and specify a delivery destination through the Internet 6. Processor 20 can transmit request information input through display 22 to server 5 through communication device 23 and the Internet 6. The request information includes, for example, information specifying a purchased commodity, and delivery request information. The delivery request information includes, for example, information indicating the delivery time and information indicating a delivery destination.

Figure 4:
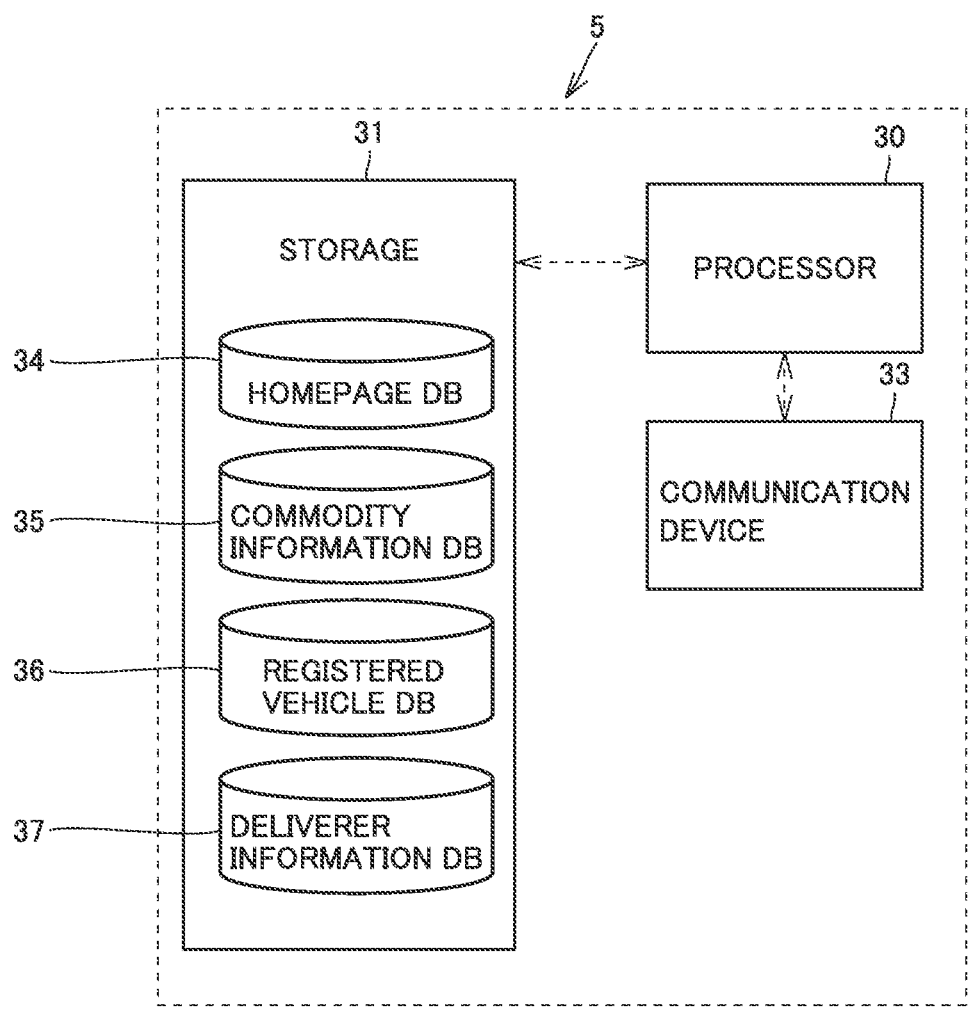
FIG. 4 is a block diagram schematically showing a configuration of a server 5.

FIG. 4 is a block diagram schematically showing a configuration of server 5. Server 5 includes a processor 30, a storage 31 and a communication device 33. Processor 30 executes processing operation using information stored in storage 31 and information obtained through communication device 33. The processing operation in processor 30 is executed by software or hardware such as an electric circuit.

Various types of information are prestored in storage 31, and information obtained through communication device 33 is also stored in storage 31. A homepage information database 34, a commodity information database 35, a registered vehicle database 36, and a deliverer information database 37 are, for example, stored in storage 31.

Information about a homepage that can be accessed by user 9 through user terminal 4 is stored in homepage information database 34.

Commodity information about each commodity put on a homepage is stored in commodity information database 35. Information about a vehicle that can be specified as a delivery destination is stored in registered vehicle database 36. For example, information such as a communication ID, a vehicle type and a color of each vehicle is stored. A communication ID of deliverer terminal 3 and the like are stored in deliverer information database 37.

Communication device 33 exchanges various types of information with vehicle 2, deliverer terminal 3 and user terminal 4 through the Internet 6.

Figure 5:
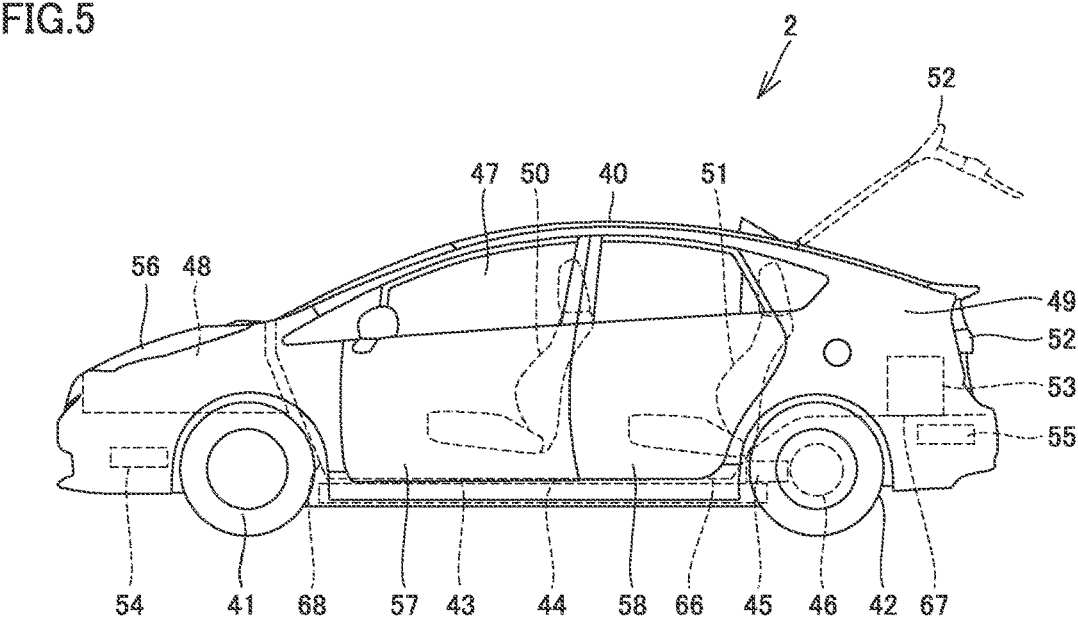
FIG. 5 is a side view showing a configuration of a vehicle 2.

FIG. 5 is a side view showing a configuration of vehicle 2. Vehicle 2 includes a vehicle main body 40, a front wheel 41, a rear wheel 42, a battery 44, a PCU 45, and a motor 46.

Battery 44 is a secondary battery that can charge and discharge electric power. Front wheel 41 is disposed more frontward than a center in a front-back direction of vehicle main body 40. Rear wheel 42 is disposed more rearward than the center in the front-back direction of vehicle main body 40.

PCU (Power Control Unit) 45 converts DC power from battery 44 to AC power and supplies the AC power to motor 46. Using the supplied AC power, motor 46 is driven to rotate rear wheel 42. As described above, vehicle 2 according to the first embodiment is typically an electric vehicle. Vehicle 2 may be a hybrid vehicle and the like.

A passenger compartment 47, a front accommodation compartment 48 and a rear accommodation compartment 49 are formed in vehicle main body 40. Front accommodation compartment 48 is formed more frontward of vehicle 2 than passenger compartment 47. Rear accommodation compartment 49 is formed more rearward of vehicle 2 than passenger compartment 47.

Vehicle main body 40 includes a floor panel 43, a front-row seat 50, a rear-row seat 51, a rear hatch 52, a front hatch 56, a front door 57, and a rear door 58.

Floor panel 43 forms a bottom surface of vehicle 2. Floor panel 43 includes a center floor panel 66, a rear floor panel 67 and a partition wall 68.

Center floor panel 66 forms a lower surface of passenger compartment 47. Rear floor panel 67 forms a lower surface of rear accommodation compartment 49. Passenger compartment 47 and front accommodation compartment 48 are separated by partition wall 68.

Front-row seat 50 and rear-row seat 51 are provided in passenger compartment 47. Rear-row seat 51 is disposed more rearward than front-row seat 50.

Front door 57 and rear door 58 are provided on vehicle main body 40 so as to be openable and closable. By opening front door 57 and rear door 58, a passenger can get in and out of passenger compartment 47.

Rear-row seat 51 divides a space in vehicle 2 into passenger compartment 47 and rear accommodation compartment 49. Rear hatch 52 is provided so as to be pivotable with respect to vehicle main body 40. By opening rear hatch 52, rear accommodation compartment 49 can be opened. Front hatch 56 is provided so as to be pivotable with respect to vehicle main body 40. By opening front hatch 56, front accommodation compartment 48 can be opened.

Vehicle 2 includes a cooling box 53, a cooling circuit 54 and a cooling circuit 55. Cooling circuit 54 is provided in a lower part of front accommodation compartment 48. Cooling circuit 54 cools the air in passenger compartment 47.

Figure 6:
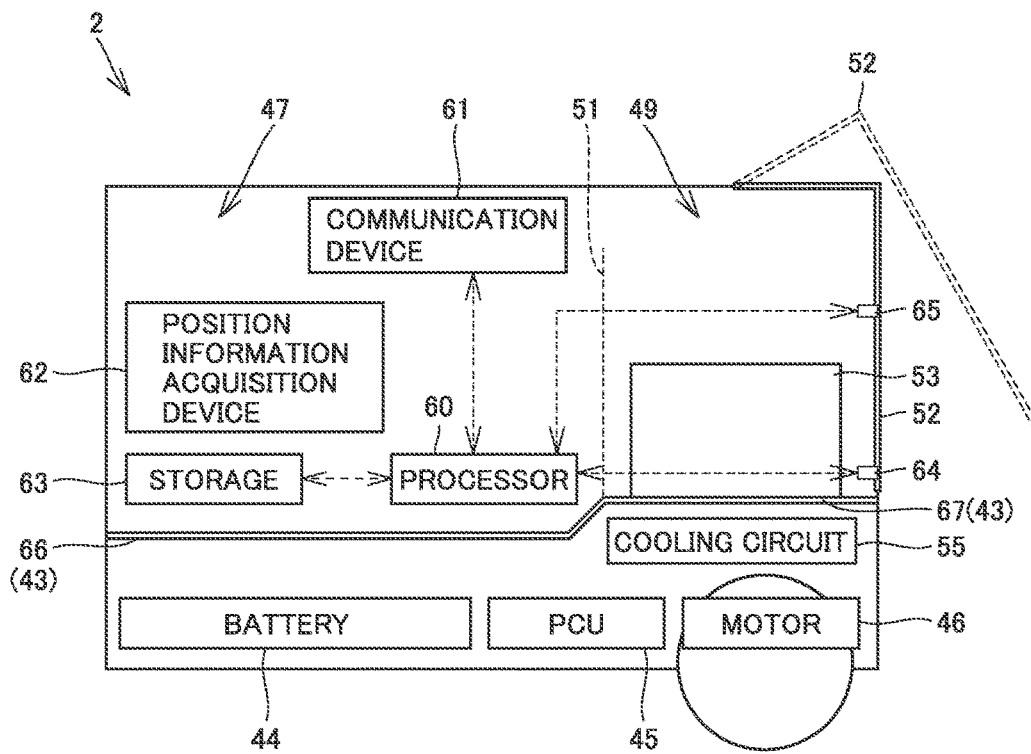
FIG. 6 is a schematic diagram schematically showing vehicle 2.

FIG. 6 is a schematic diagram schematically showing vehicle 2. Cooling circuit 55 is disposed on the lower surface side of rear floor panel 67, and cooling box 53 is disposed in rear accommodation compartment 49.

Cooling circuit 55 cools the air in passenger compartment 47 and cools the air in cooling box 53.

Vehicle 2 includes an ECU 60, a communication device 61, a position information acquisition device 62, a storage 63, a communication device 64, and a locking device 65.

Communication device 61 is configured to communicate with server 5 and the like through the Internet 6. Communication device 61 transmits the obtained information to ECU 60. Locking device 65 locks rear hatch 52 in a closed state, and releases a locked state of rear hatch 52.

Communication device 64 is configured to communicate with deliverer terminal 3 located outside, a key of user 9 and the like. A communication distance of communication device 64 is, for example, approximately 1 meter and is shorter than a communication distance of communication device 61. Communication device 64 is configured to receive an authentication signal sent from the key of user 9 and to receive an opening code and the like sent from deliverer terminal 3. Communication device 64 transmits the received information to ECU 60.

Storage 63 is a nonvolatile memory having various types of information stored therein. Position information acquisition device 62 is configured to obtain position information of vehicle 2, and transmits the obtained position information to ECU 60. ECU 60 executes processing operation using various types of information stored in storage 63, the information obtained by communication device 61, the position information obtained by position information acquisition device 62, and the like, and controls driving of PCU 45 and the like.

Figure 7:
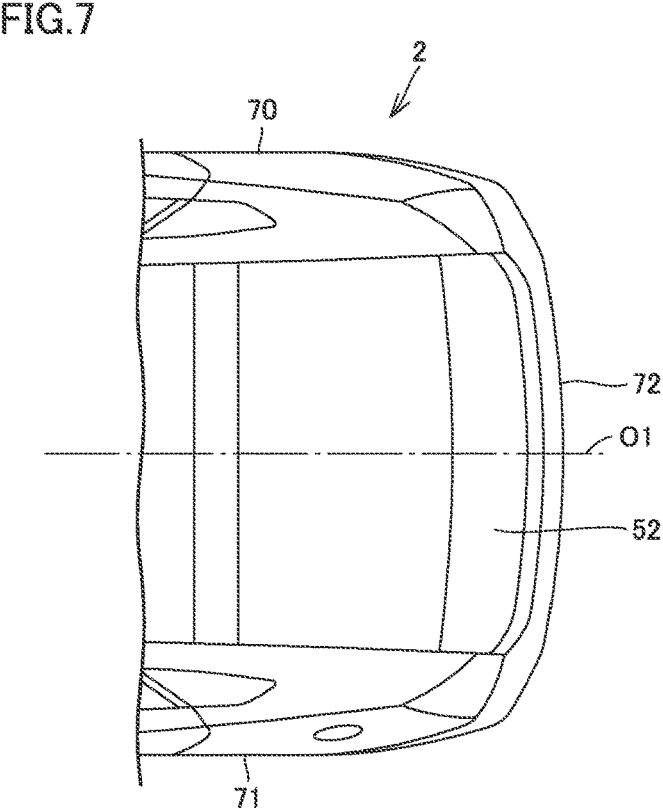
FIG. 7 is a plan view showing a configuration of vehicle 2 on the rear side.

FIG. 7 is a plan view showing a configuration of vehicle 2 on the rear side. Vehicle 2 includes a right side surface 70, a left side surface 71 and a rear surface 72. Rear hatch 52 is formed so as to extend from the rear surface 72 side toward the front of vehicle 2.

Figure 8:
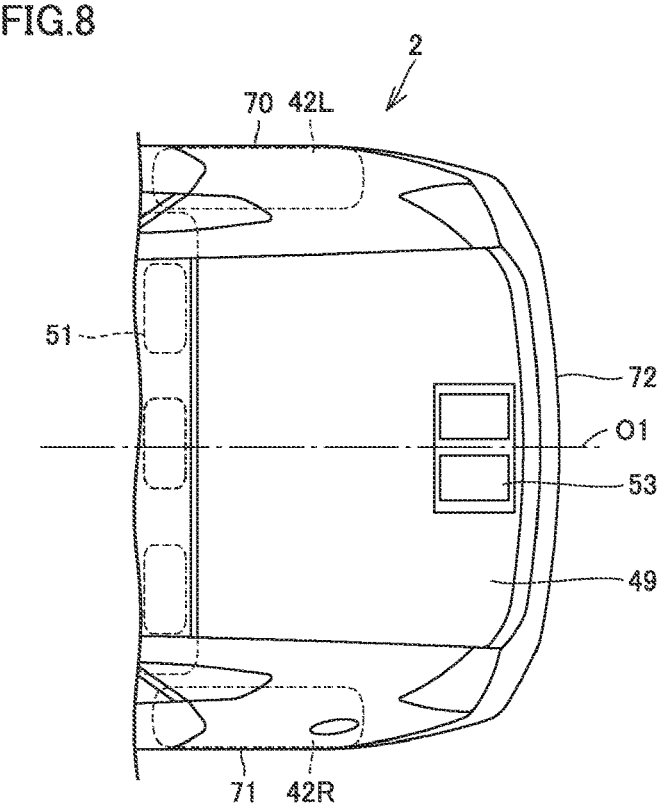
FIG. 8 is a plan view when a rear hatch 52 is omitted from the state shown in FIG. 7.

FIG. 8 is a plan view when rear hatch 52 is omitted from the state shown in FIG. 7. Cooling box 53 is disposed at a center in a width direction of vehicle 2. In FIG. 8, "O1" represents a center line passing through the center in the width direction of vehicle 2 and extending in the front-back direction of vehicle 2. In the example shown in FIG. 8, when vehicle 2 is viewed in a plan view, cooling box 53 overlaps with center line O1.

Figure 9:
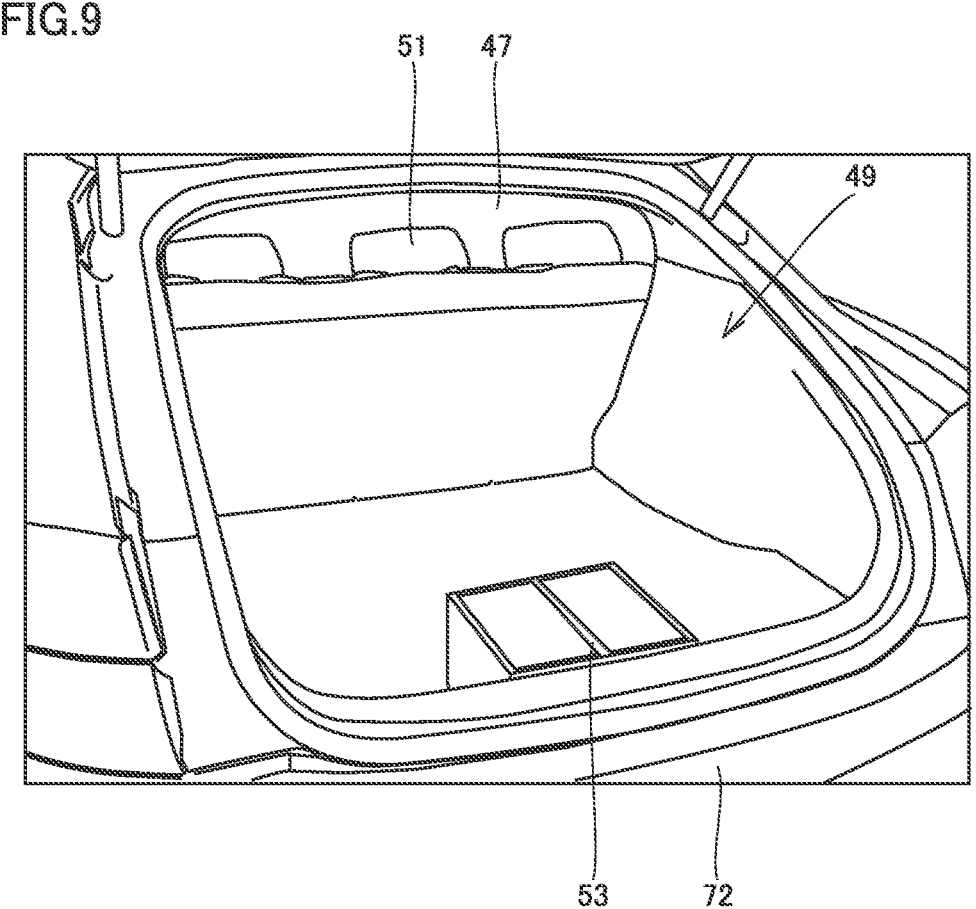
FIG. 9 is a perspective view showing the rear surface side of vehicle 2, with rear hatch 52 being open.

Vehicle 2 includes a right rear wheel 42R provided on the right side surface 70 side, and a left rear wheel 42L provided on the left side surface 71 side. Right rear wheel 42R and left rear wheel 42L are arranged in the width direction of vehicle 2. FIG. 9 is a perspective view showing the rear surface side of vehicle 2, with rear hatch 52 being open. As is clear from FIGS. 8 and 9, cooling box 53 is located closer to rear surface 72 than passenger compartment 47.

Figure 10:
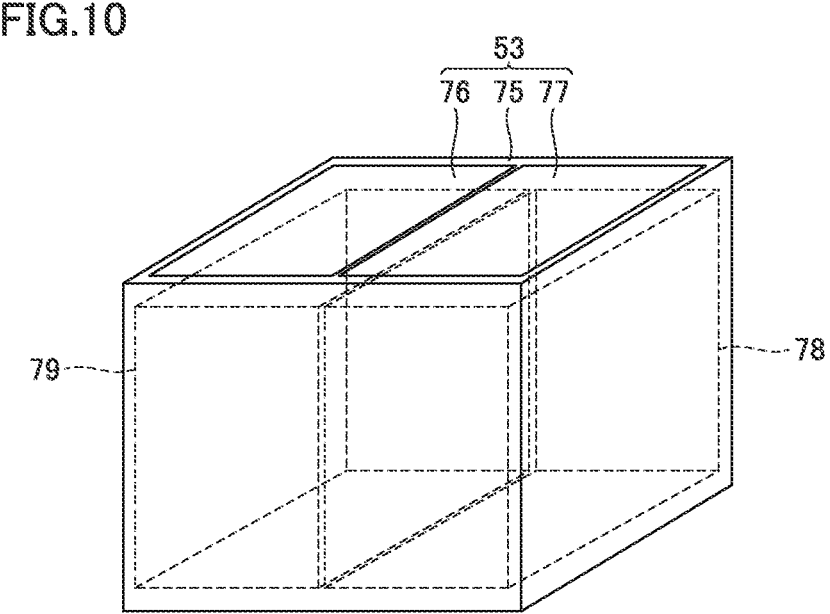
FIG. 10 is a perspective view schematically showing a cooling box 53.

FIG. 10 is a perspective view schematically showing cooling box 53. Cooling box 53 includes a main body 75 and lids 76 and 77. A refrigerating compartment 78 and a freezing compartment 79 are formed in main body 75.

Lids 76 and 77 are provided on an upper surface of main body 75. Lid 76 is provided on main body 75 such that lid 76 can open and close an opening formed in an upper part of freezing compartment 79. Lid 77 is provided on main body 75 such that lid 77 can open and close an opening formed in an upper part of refrigerating compartment 78.

Figure 11:
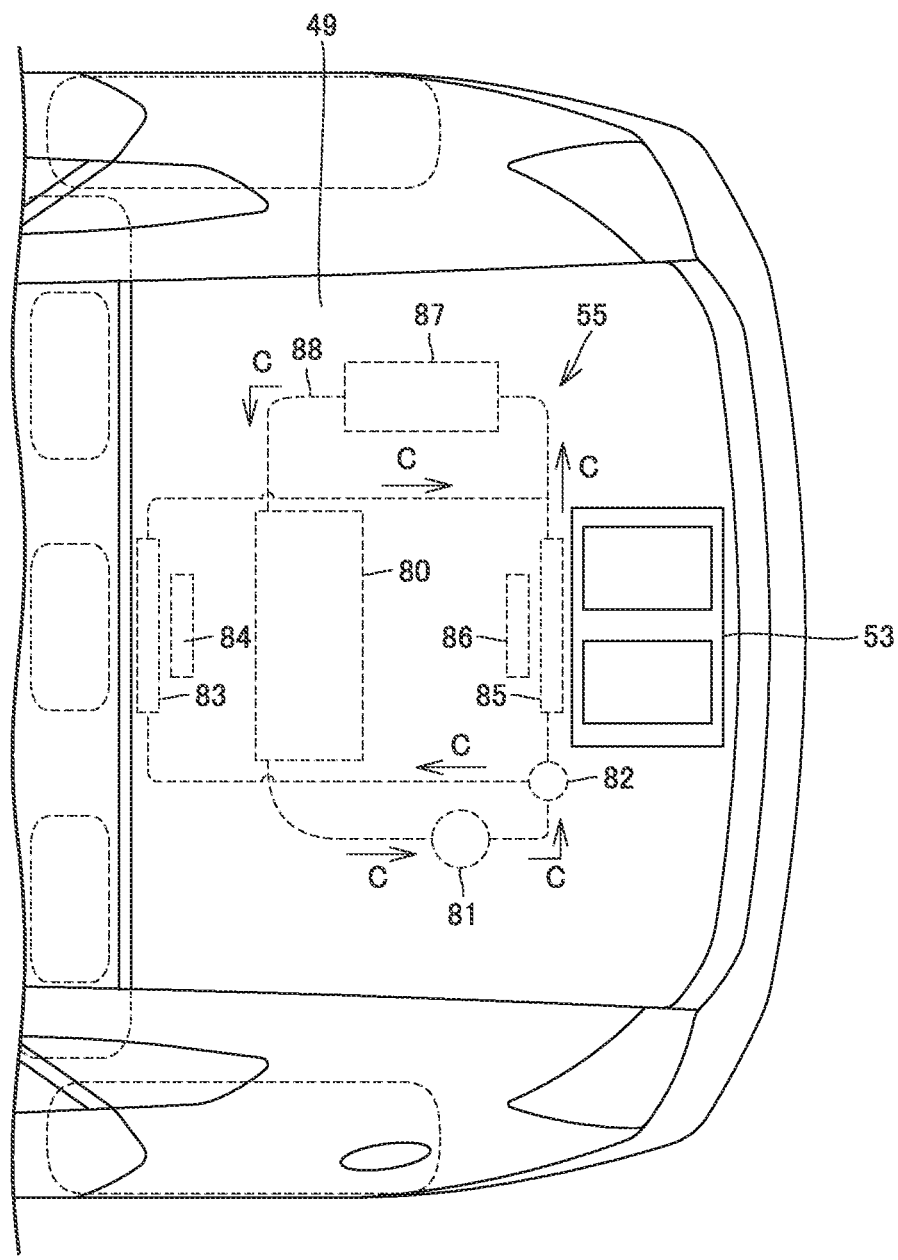

FIG. 11 is a plan view showing cooling circuit 55 and the like. When cooling circuit 55 and vehicle 2 are viewed in a plan view, cooling circuit 55 is located in rear accommodation compartment 49.

Cooling circuit 55 includes a condenser 80, a gas-liquid separator 81, an expansion valve 82, an evaporator 83, a blower 84, an evaporator 85, a blower 86, a compressor 87, a refrigerant pipe 88, and a refrigerant C.

Condenser 80 cools refrigerant C using the outdoor air. Gas-liquid separator 81 separates refrigerant C in a gas state from refrigerant C flowing through refrigerant pipe 88, and supplies refrigerant C in a liquid state to expansion valve 82. Expansion valve 82 adiabatically expands refrigerant C and supplies refrigerant C in a mist state to evaporators 83 and 85.

Blower 84 blows the air in passenger compartment 47 on evaporator 83 to thereby cool the air in passenger compartment 47. The cooled air is returned to passenger compartment 47.

Blower 86 blows the air in cooling box 53 on evaporator 85. As a result, the air in cooling box 53 is excellently cooled. The cooled air is returned to cooling box 53.

As described above, cooling circuit 55 cools the air in passenger compartment 47 and cools the air in cooling box 53. When vehicle 2 is viewed in a plan view, cooling circuit 55 is located in rear accommodation compartment 49. Therefore, a distance between cooling box 53 and cooling circuit 55 is short, and thus, cooling circuit 55 can efficiently cool the air in cooling box 53.

Delivery system 1 configured as mentioned above will be described.

Figure 12:
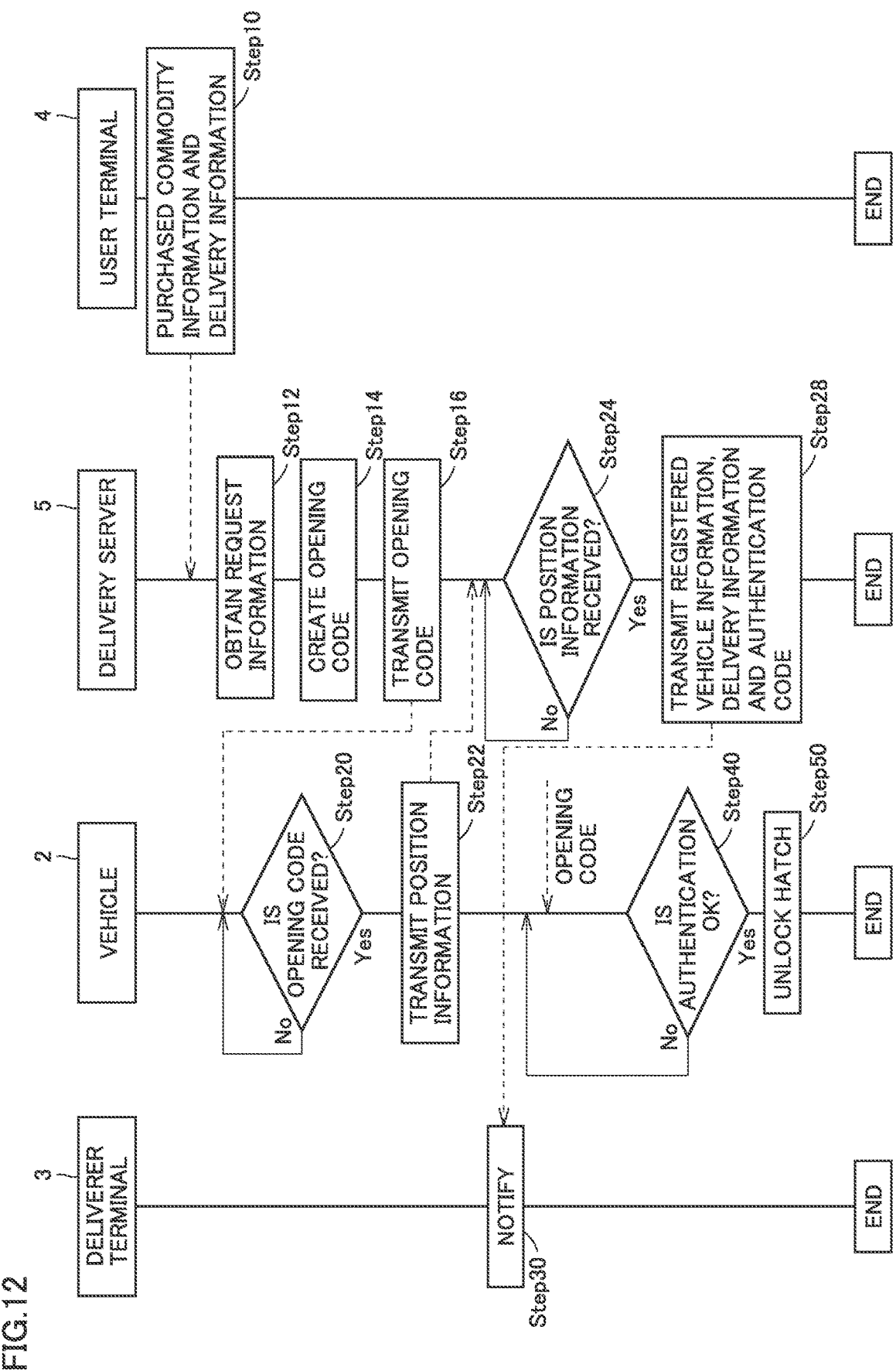
FIG. 12 is a sequence diagram of delivery system 1.

FIG. 12 is a sequence diagram of delivery system 1. User 9 operates user terminal 4 and specifies a commodity to be purchased and a delivery destination of the purchased commodity on a homepage. At this time, vehicle 2 is specified as the delivery destination of the purchased commodity.

Using user terminal 4, user 9 can access a homepage, and purchase a commodity put on the homepage and specify a delivery destination of the purchased commodity.

User terminal 4 transmits request information including information about the commodity purchased by user 9 and delivery information to server 5 (Step 10). When server 5 obtains the request information, server 5 creates an opening code (Step 14). When server 5 creates the opening code, server 5 transmits the opening code to vehicle 2 (Step 16). When vehicle 2 receives the opening code (Yes in Step 20), vehicle 2 transmits position information to server 5 (Step 22).

When server 5 obtains the position information from vehicle 2, server 5 transmits registered vehicle information of vehicle 2, the delivery information and the opening code to deliverer terminal 3 (Step 28).

When deliverer terminal 3 receives the registered vehicle information, the delivery information and the opening code from server 5, deliverer terminal 3 notifies deliverer 7 that these pieces of information have been received (Step 30).

The registered vehicle information includes, for example, information about a type, a color and the like of vehicle 2. The delivery information includes the information about the commodity purchased by user 9, the position information of vehicle 2 as the delivery destination, and the delivery time. The opening code is an opening signal for unlocking locking device 65 of vehicle 2.

Deliverer 7 moves close to vehicle 2, based on the position information of vehicle 2. Then, deliverer 7 can come very close to vehicle 2 with reference to the type, the color and the like of the vehicle included in the vehicle information.

Figure 13:
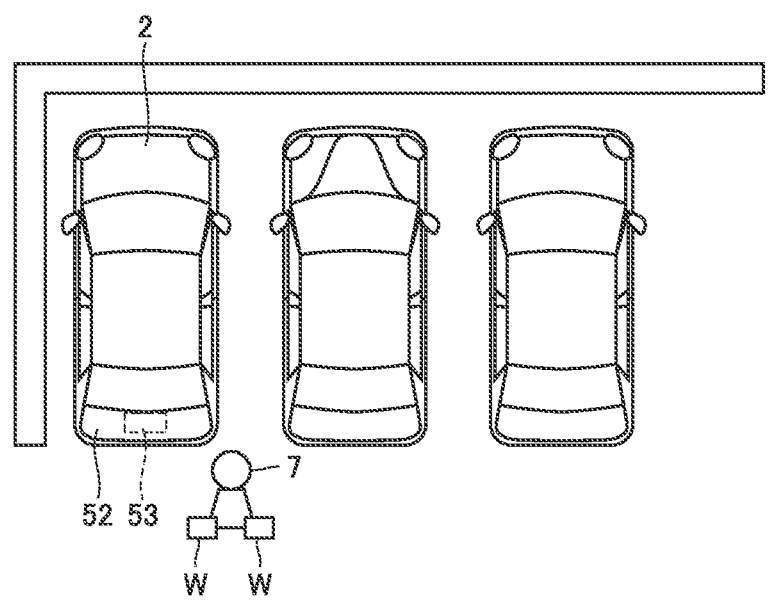
FIG. 13 is a schematic diagram showing, in a plan view, a state in which a deliverer 7 has come very close to vehicle 2.
Figure 14:
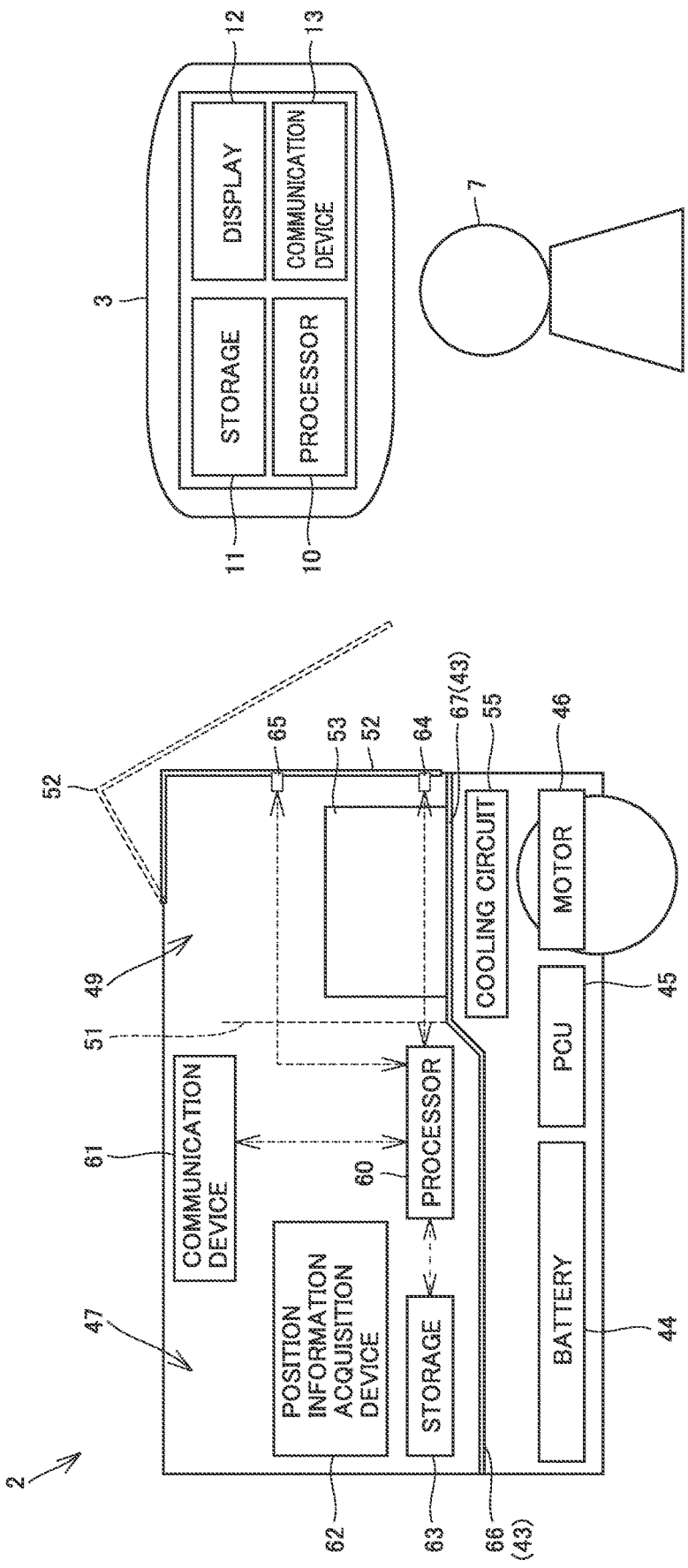
FIG. 14 is a schematic diagram showing a state in which deliverer 7 has come close to rear hatch 52.

FIG. 13 is a schematic diagram showing, in a plan view, a state in which deliverer 7 has come very close to vehicle 2. In the example shown in FIG. 13, vehicle 2 is parked forward. For example, in Europe, the United States and the like, forward parking is common when parking a vehicle. Therefore, deliverer 7 can easily come close to rear hatch 52. FIG. 14 is a schematic diagram showing a state in which deliverer 7 has come close to rear hatch 52. Referring to FIGS. 14 and 12, deliverer 7 operates deliverer terminal 3 and transmits the opening code from communication device 13 to communication device 64. A distance that allows communication between communication device 64 and communication device 13 is, for example, approximately 1 meter.

When communication device 64 receives the opening code, communication device 64 transmits the received opening code to ECU 60. ECU 60 determines whether or not the opening code matches with the opening code received in Step 20 (Step 40). When ECU 60 determines that the opening code matches with the opening code received in Step 20 (Yes in Step 40), ECU 60 releases the locked state by locking device 65 (Step 50). As a result, deliverer 7 can put delivery item W into cooling box 53.

As shown in FIGS. 8 and 9, cooling box 53 is located closer to rear surface 72 of vehicle 2 than passenger compartment 47. Therefore, deliverer 7 can easily put delivery item W into cooling box 53.

Furthermore, cooling box 53 is disposed at the center in the width direction of vehicle 2. Therefore, even when delivery item W is put into cooling box 53, disturbance of the weight balance of vehicle 2 in the width direction can be suppressed. In addition, lids 76 and 77 of cooling box 53 are provided on the upper surface side of cooling box 53. Therefore, deliverer 7 can easily put delivery item W into refrigerating compartment 78 or freezing compartment 79.

Although the case of forward parking of vehicle 2 has been described in the example shown in FIG. 13, the case of reverse parking of vehicle 2 is also conceivable. In such a case, it is possible to reduce the possibility that cooling box 53 is visible to other surrounding people when delivery item W is put into cooling box 53. As a result, the privacy of user 9 is easily protected.

Second Embodiment

A vehicle 2A according to a second embodiment will be described with reference to FIG. 15 and the like. Similarly to vehicle 2 according to the first embodiment, vehicle 2A according to the second embodiment can also be specified as a delivery destination of delivery item W in delivery system 1.

Figure 15:
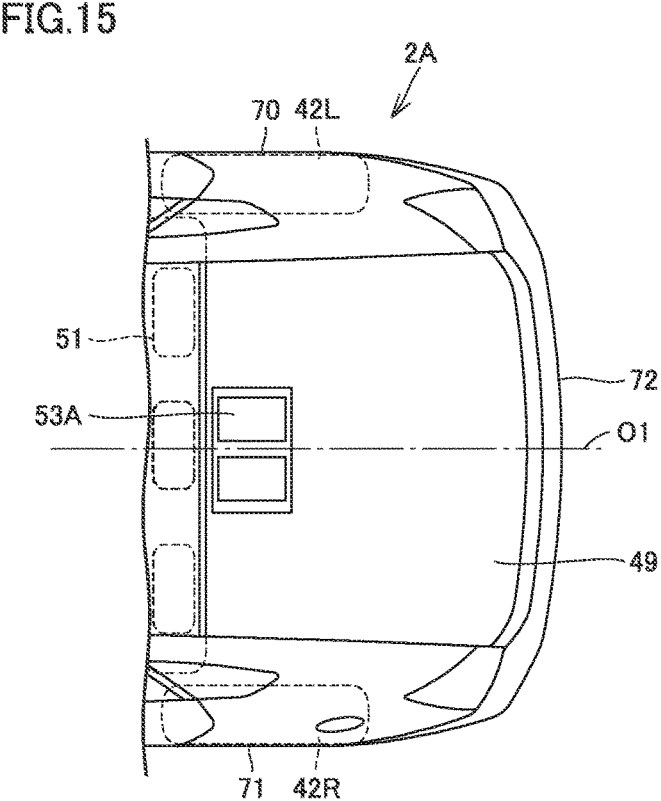
FIG. 15 is a plan view showing a part of a vehicle 2A according to a second embodiment.
Figure 16:
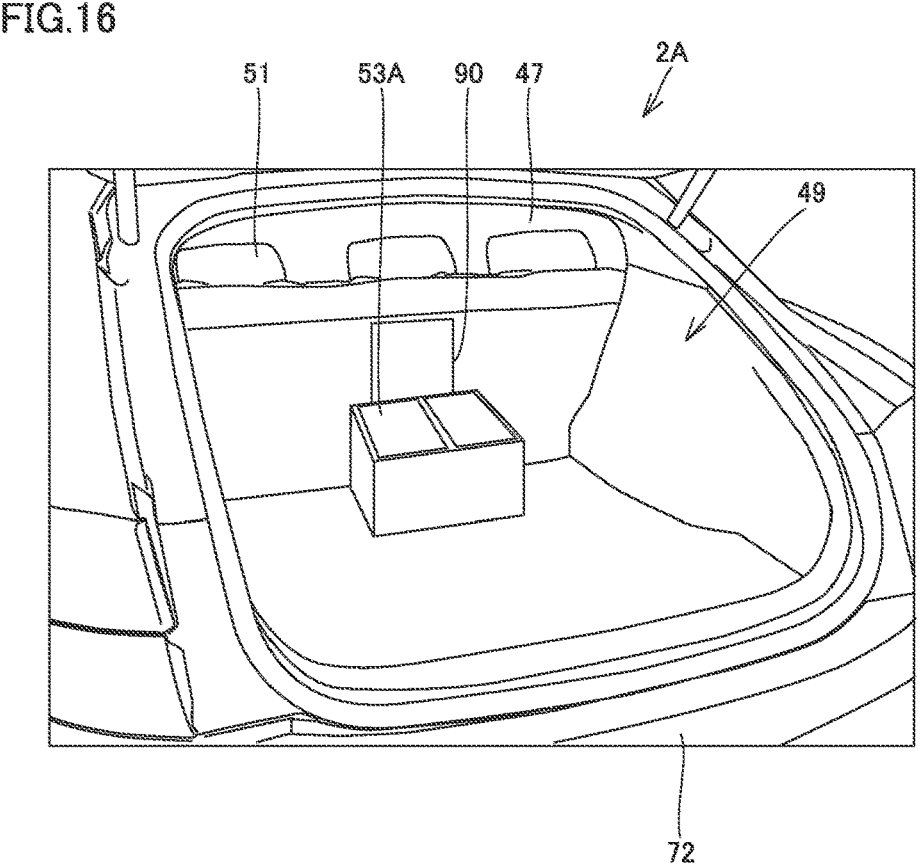
FIG. 16 is a perspective view of vehicle 2A, with rear hatch 52 being open.

FIG. 15 is a plan view showing a part of vehicle 2A according to the second embodiment. FIG. 16 is a perspective view of vehicle 2A, with rear hatch 52 being open.

Vehicle 2A includes a cooling box 53A. Cooling box 53A is accommodated in rear accommodation compartment 49 and is located closer to rear-row seat 51 (passenger compartment 47) than rear surface 72. A rear surface of rear-row seat 51 is provided with a take-out door 90.

Figure 17:
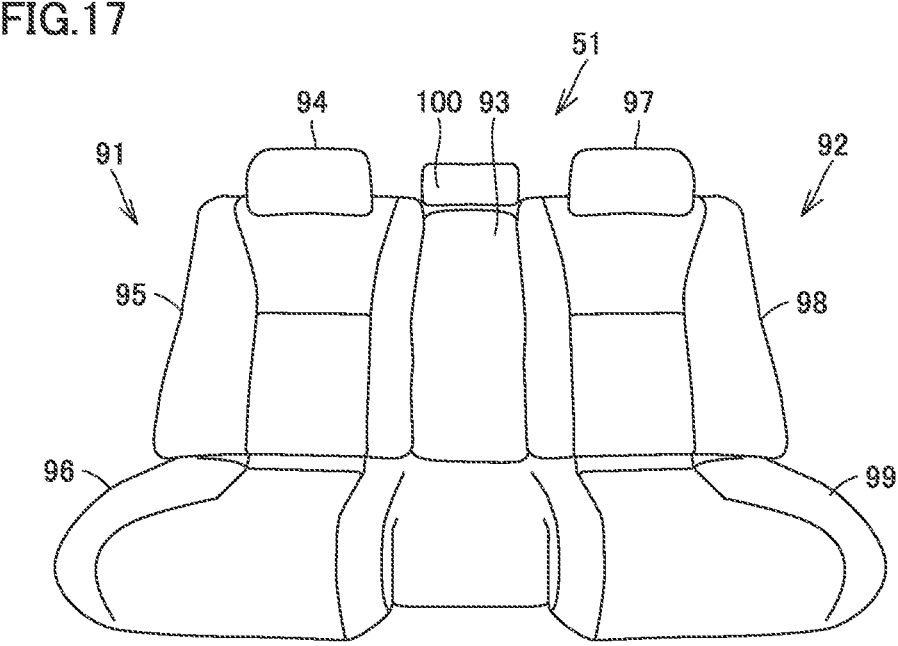
FIG. 17 is a front view showing a rear-row seat 51.

FIG. 17 is a front view showing rear-row seat 51. Rear-row seat 51 includes a rear side seat 91, a rear side seat 92, an arm rest 93, and a head rest 100.

Rear-row seat 51 includes a head rest 94, a seat back 95 and a seat cushion 96. Rear side seat 92 includes a head rest 97, a seat back 98 and a seat cushion 99. Head rest 100 is disposed above arm rest 93.

Figure 18:
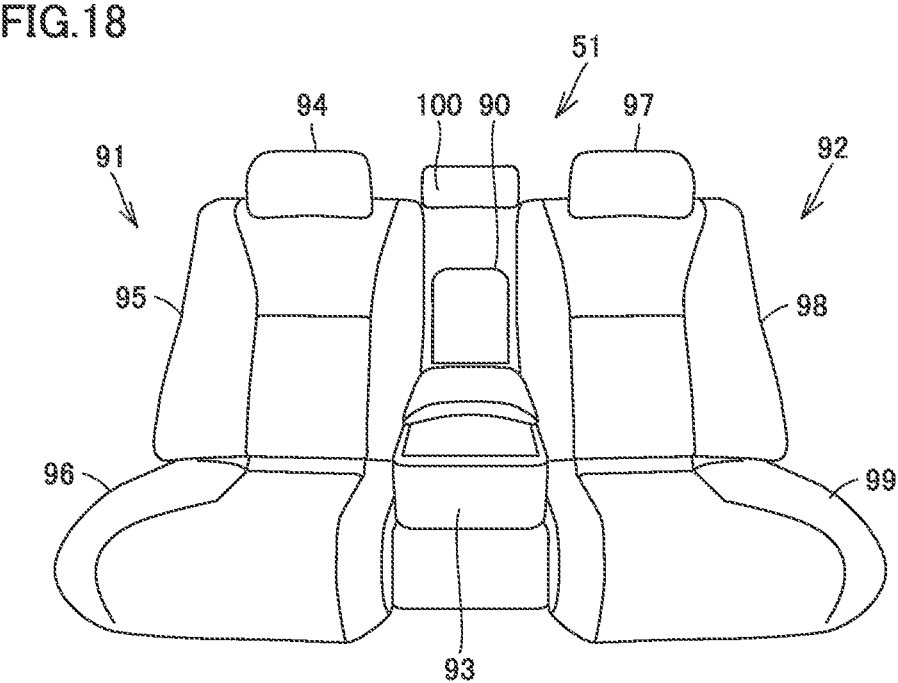
FIG. 18 is a front view of rear-row seat 51, with an arm rest 93 being rotated and disposed on seat cushions 96 and 99.

FIG. 18 is a front view of rear-row seat 51, with arm rest 93 being rotated down and disposed on seat cushions 96 and 99.

When arm rest 93 is moved down, take-out door 90 is exposed to the passenger compartment 47 side. By opening take-out door 90, the passenger can reach cooling box 53A and take out a contained object from cooling box 53A.

According to vehicle 2A, the passenger can take out delivered delivery item W inside vehicle 2A, and thus, the passenger's convenience is improved.

Furthermore, cooling box 53A is disposed between right rear wheel 42R and left rear wheel 42L. Therefore, even when vehicle 2A receives side collision, damage of cooling box 53A can be suppressed.

A vehicle 2B which is a modification of the vehicle according to the second embodiment will be described with reference to FIGS. 19 to 22.

Figure 19:
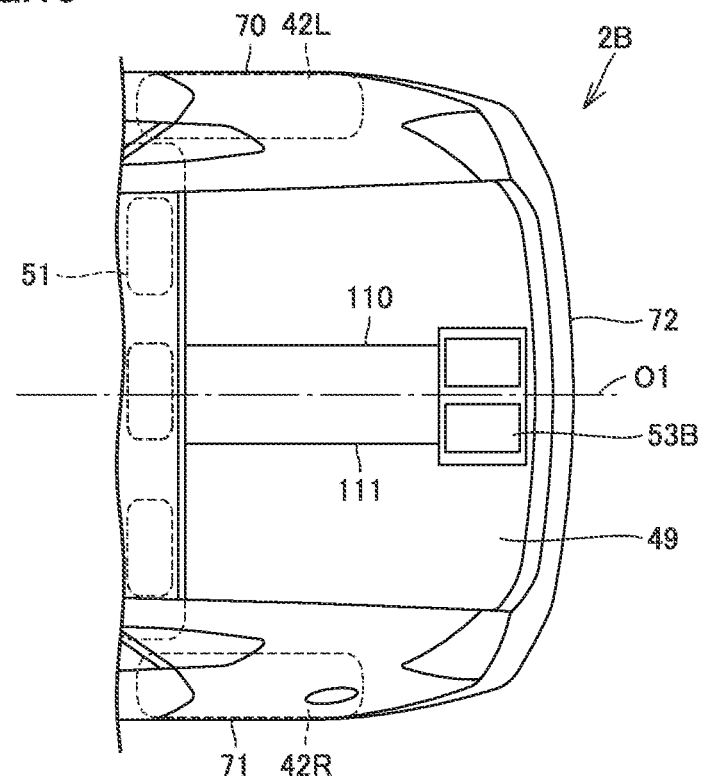
FIG. 19 is a plan view showing the rear side of a vehicle 2B.
Figure 20:
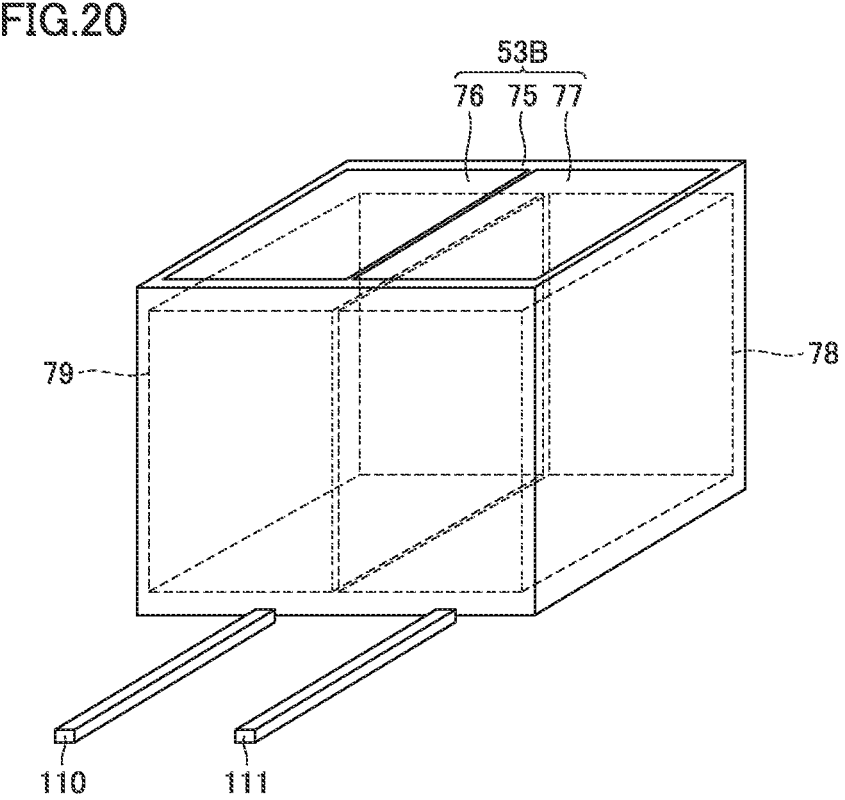
FIG. 20 is a perspective view showing a configuration of a cooling box 53B and its surroundings.

FIG. 19 is a plan view showing the rear side of vehicle 2B. FIG. 20 is a perspective view showing a configuration of a cooling box 53B and its surroundings.

Vehicle 2B includes cooling box 53B and rails 110 and 111. Rails 110 and 111 are disposed on a bottom surface of rear accommodation compartment 49 of vehicle 2B. Rails 110 and 111 are provided so as to extend in the front-back direction of vehicle 2B.

Cooling box 53B rests on rails 110 and 111 and is provided so as to be movable in a direction of extension of rails 110 and 111.

Figure 21:
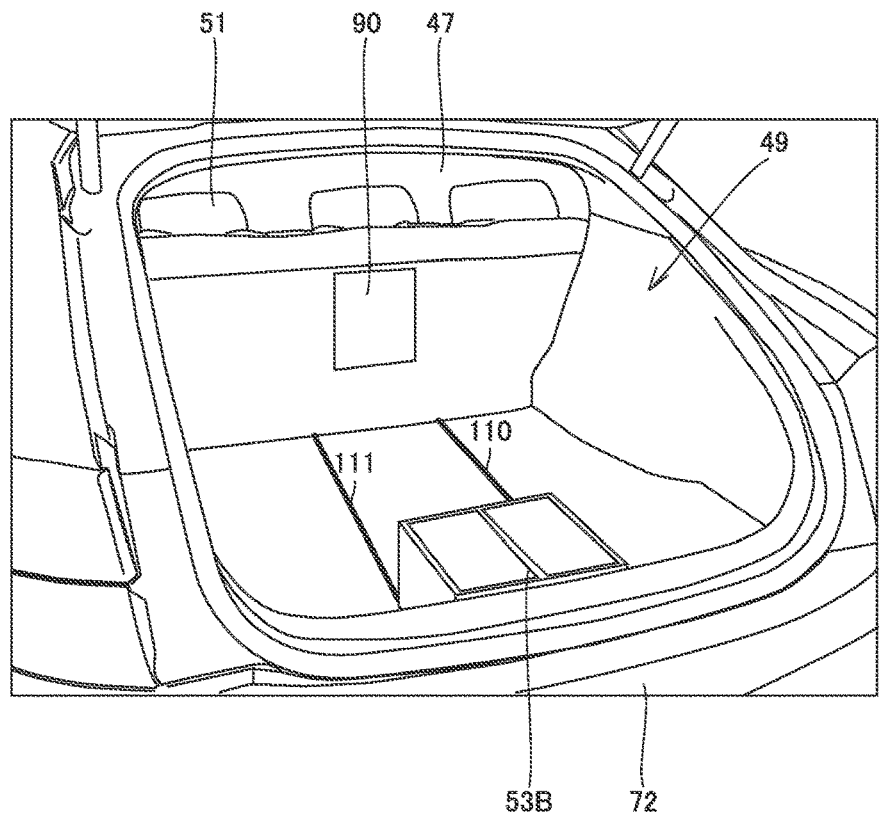
FIG. 21 is a perspective view showing a state in which cooling box 53B is disposed on the rear surface 72 side.
Figure 22:
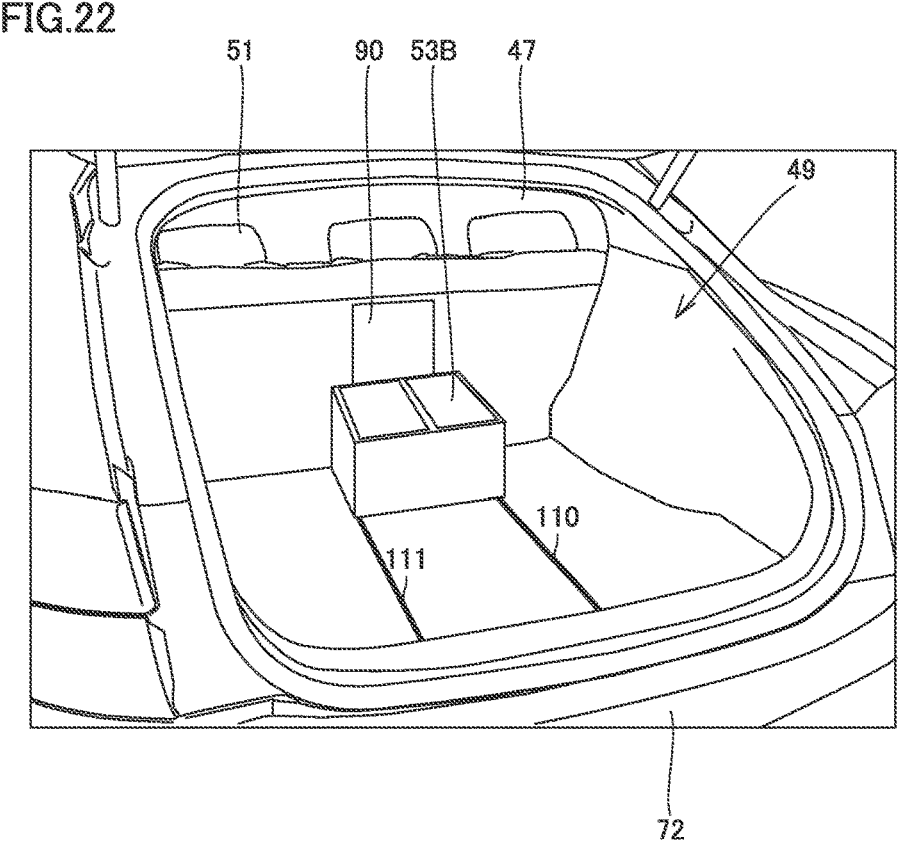
FIG. 22 is a perspective view showing a state in which cooling box 53B is disposed on the rear-row seat 51 side.

FIG. 21 is a perspective view showing a state in which cooling box 53B is disposed on the rear surface 72 side. FIG. 22 is a perspective view showing a state in which cooling box 53B is disposed on the rear-row seat 51 side.

In this way, cooling box 53B is provided so as to be movable between the rear surface 72 side and the rear-row seat 51 (passenger compartment 47) side of vehicle 2B.

Therefore, for example, when user 9 requests deliverer 7 to deliver delivery item W, user 9 disposes cooling box 53B on the rear surface 72 side as shown in FIG. 21. Thus, deliverer 7 can easily put delivery item W into cooling box 53B.

For example, when user 9 gets in vehicle 2B and drives vehicle 2B, user 9 moves cooling box 53B to the rear-row seat 51 side as shown in FIG. 22. Thus, user 9 can open take-out door 90 and take out the object contained in cooling box 53B from the passenger compartment 47 side.

Figure 23:
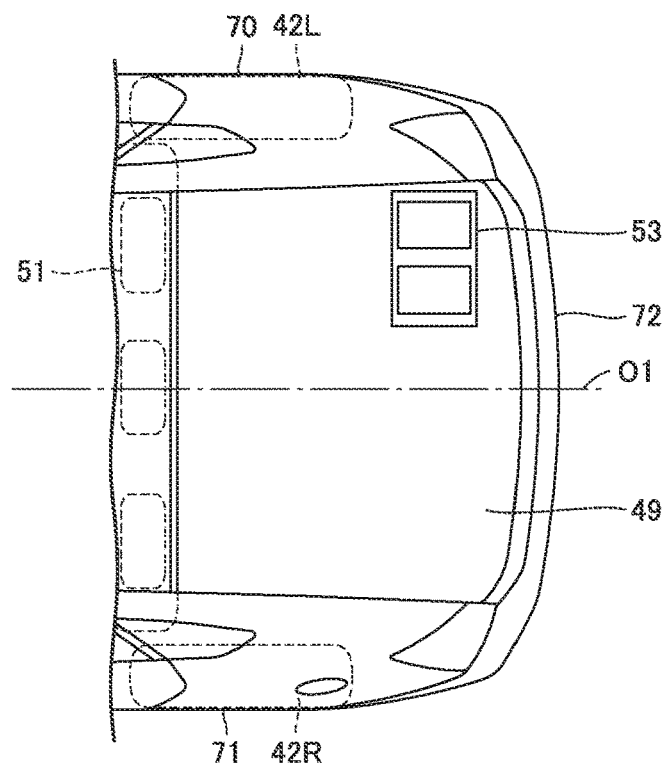
FIG. 23 is a plan view showing an example in which cooling box 53 is disposed on the right side surface 70 side.
Figure 24:
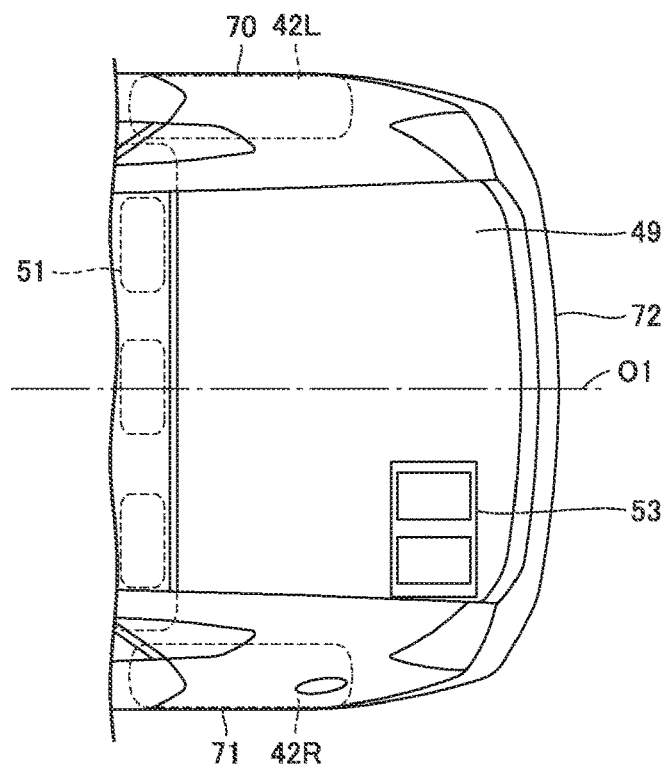
FIG. 24 is a plan view showing an example in which cooling box 53 is disposed on the left side surface 71 side.

Although the case of disposing cooling box 53 at the center in the width direction of the vehicle has been described in the first and second embodiments above, cooling box 53 may be disposed on one side surface side. FIG. 23 is a plan view showing an example in which cooling box 53 is disposed on the right side surface 70 side. FIG. 24 is a plan view showing an example in which cooling box 53 is disposed on the left side surface 71 side.

While the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A vehicle used in a delivery system including the vehicle, a user terminal, a server and a deliverer terminal, the vehicle comprising:

a vehicle main body having a compartment;

a hatch provided on the vehicle main body and configured to open and close the compartment;

a first communication device configured to communicate with the server;

a second communication device having a communication distance shorter than that of the first communication device and configured to communicate with the deliverer terminal;

a locking device configured to lock the hatch; and a processor, the deliverer terminal including a display showing received information and a third communication device, the user terminal transmitting request information to the server, the request information including commodity information about a commodity purchased by a user and delivery information including a delivery time, the server transmitting registered vehicle information of the vehicle, the commodity information and an opening code to the deliverer terminal, when the server obtains the commodity information and the delivery information, the deliverer terminal receiving the registered vehicle information, the commodity information and an opening signal from the server, the registered vehicle information including information about at least one of a type and a color of the vehicle, the third communication device being capable to transmit the opening signal to the second communication device, and the processor being configured to receive information about the opening signal from the server through the first communication device, and to open the hatch when the processor receives the opening signal from the deliverer terminal through the second communication device.

* * * * *